US012294168B2

(12) United States Patent
Meng et al.

(10) Patent No.: US 12,294,168 B2
(45) Date of Patent: May 6, 2025

(54) ELECTRICAL RECEPTACLE CONNECTOR AND ELECTRICAL CONNECTOR ASSEMBLY HAVING THE SAME

(71) Applicant: ADVANCED-CONNECTEK INC., New Taipei (TW)

(72) Inventors: Ta-Teh Meng, New Taipei (TW); Mei Shi, New Taipei (TW); Ya-Ping Liang, New Taipei (TW); Meng Liu, New Taipei (TW); Ping Shi, New Taipei (TW); Man Ge, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 429 days.

(21) Appl. No.: 17/968,248

(22) Filed: Oct. 18, 2022

(65) Prior Publication Data

US 2023/0127973 A1 Apr. 27, 2023

(30) Foreign Application Priority Data

Oct. 21, 2021 (CN) ........................ 202122531655.X

(51) Int. Cl.

| | |
|---|---|
| ***H01R 12/71*** | (2011.01) |
| ***H01R 13/05*** | (2006.01) |
| ***H01R 13/11*** | (2006.01) |
| ***H01R 13/516*** | (2006.01) |
| ***H01R 13/633*** | (2006.01) |

(52) U.S. Cl.

CPC ........... *H01R 12/716* (2013.01); *H01R 13/05* (2013.01); *H01R 13/11* (2013.01); *H01R 13/516* (2013.01); *H01R 13/633* (2013.01)

(58) Field of Classification Search

CPC .. H01R 13/6275; H01R 12/716; H01R 13/05; H01R 13/11; H01R 13/516; H01R 13/633; H01R 12/707; H01R 12/73

See application file for complete search history.

(56) References Cited

U.S. PATENT DOCUMENTS

2016/0248190 A1* 8/2016 Matsuyama ....... H01R 13/6273
2019/0334290 A1* 10/2019 Droesbeke ........... H01R 13/629

FOREIGN PATENT DOCUMENTS

TW 568528 U * 10/2018 ........... H01R 13/428

* cited by examiner

*Primary Examiner* — Jean F Duverne

(74) *Attorney, Agent, or Firm* — Muncy, Geissler, Olds & Lowe, P.C.

(57) ABSTRACT

An electrical connector assembly includes an electrical plug connector and an electrical receptacle connector. The electrical plug connector includes plug fixation members. The electrical receptacle connector includes receptacle fixation members. Through the engagement between the plug fixation member and the receptacle fixation member, upon using the electrical connector assembly, the electrical plug connector can be ensured not to detach from the electrical receptacle connector. Moreover, with simple operations of the plug fixation member and the receptacle fixation member, the electrical plug connector can be detached from the electrical receptacle connector smoothly.

20 Claims, 7 Drawing Sheets

ELECTRICAL RECEPTACLE CONNECTOR AND ELECTRICAL CONNECTOR ASSEMBLY HAVING THE SAME

CROSS-REFERENCE TO RELATED APPLICATION

This non-provisional application claims priority under 35 U.S.C. § 119(a) to Patent Application No. 202122531655.X filed in China, P.R.C. on Oct. 21, 2021, the entire contents of which are hereby incorporated by reference.

FIELD OF THE INVENTION

The instant disclosure relates to an electrical connector, and more particular to an electrical receptacle connector and an electrical connector assembly having the same, wherein the electrical connector assembly may be for example a board-to-board electrical connector assembly.

BACKGROUND

Electrical devices, especially consumer portable products, tend to become smaller, thinner, and lighter. An electrical device usually includes different circuit boards therein which need to be electrically connected to each other. In order to improve the utilization rate of the space inside the electrical device, the different circuit boards are usually applied with a board to board (BTB) electrical connector for electrical connection.

SUMMARY OF THE INVENTION

The BTB electrical connector is an electrical connector assembly. In general, the electrical connector assembly includes a plug connector and a receptacle connector corresponding to the plug connector. A plurality of male terminals is arranged on the body of the plug connector, and a plurality of female terminals is arranged on the body of the receptacle connector. When the plug connector is mated with the receptacle connector, the male terminals are mated with the female terminals, so that the signal transmission between two circuit boards can be achieved.

Regarding an electrical connector known to the inventor, because of the mating structures of the electrical connector, the electrical connector can be only soldered on the edge portion of the motherboard, and a larger space has to be provided for the electrical connector. As a result, the space of the mother board will be wasted. Regarding another electrical connector known to the inventor, because of the mating structures of the plug connector and the receptacle connector, the electrical connector may be damaged or broken under long-time use. Regarding yet another electrical connector known to the inventor, a specific key has to be utilized to detach the plug connector from the receptacle connector. As a result, the operator has to perform the unlocking procedure carefully. Otherwise, the mating structures of the electrical connector may be damaged.

In view of this, an embodiment of the instant disclosure provides an electrical connector assembly. The electrical connector assembly comprises an electrical plug connector and an electrical receptacle connector.

The electrical plug connector comprises a plug insulated housing, a plurality of plug terminals, and two plug fixation members. The plug terminals are on the plug insulated housing, and the two plug fixation members are at two ends of the plug insulated housing. Each of the two plug fixation members comprises a first main body and two first engaging portions. The two first engaging portion are respectively connected to two sides of the first main body.

The electrical receptacle connector comprises a receptacle insulated housing, a plurality of receptacle terminals, and two receptacle fixation members. The receptacle insulated housing comprises a space and guiding post. The guiding post extends along an extension direction of the receptacle insulated housing and in the space. The receptacle insulated housing further comprises two connection spaces. Each of the two connection spaces communicates a top surface of the receptacle insulated housing with a bottom surface of the receptacle insulated housing, and the two connection spaces are at two ends of the guiding post. The receptacle terminals are at two side walls of the receptacle insulated housing and two sides of the guiding post. The two receptacle fixation members correspond to the two plug fixation members and in the two connection spaces. Each of the two receptacle fixation members comprises a second main body and two second engaging portions. The two second engaging portions are respectively connected to two sides of the second main body. Each of the two second engaging portions comprises a limiting elastic arm. The two second engaging portions are opposite to each other, and a distance is between each of the two second engaging portions and a corresponding one of the two side walls of the receptacle insulated housing. When the electrical plug connector is mated with the electrical receptacle connector, the two first engaging portions respectively abut against the two second engaging portions, so that each of the two limiting elastic arms is moved from a normal position toward the side wall of the receptacle insulated housing adjacent to the second engaging portion. When each of the two first engaging portions is moved to an engaged position, the two limiting elastic arms are resiliently moved to the normal position to limit movements of the two first engaging portions.

Another embodiment of the instant disclosure provides an electrical receptacle connector for being mated with an electrical plug connector. The electrical plug connector comprises a plug insulated housing, a plurality of plug terminals, and a two plug fixation members. The plug terminals are on the plug insulated housing, and the two plug fixation members are at two ends of the plug insulated housing. Each of the two plug fixation members comprises a first main body and two first engaging portions, and the two first engaging portions are respectively connected to two sides of the first main body. The electrical receptacle connector comprises a receptacle insulated housing, a plurality of receptacle terminals, and two receptacle fixation member. The receptacle insulated housing has a space and comprises a guiding post, and the guiding post extends along an extension direction of the receptacle insulated housing and in the space. The receptacle insulated housing further has two connection spaces, each of the two connection spaces communicates a top surface of the receptacle insulated housing with a bottom surface of the receptacle insulated housing, and the two connection spaces are at two ends of the guiding post. The receptacle terminals are at two side walls of the receptacle insulated housing and two sides of the guiding post. The two receptacle fixation members correspond to the two plug fixation members and in the two connection spaces. Each of the two receptacle fixation members comprises a second main body and two second engaging portions. The two second engaging portions are respectively connected to two sides of the second main body. Each of the two second engaging portions comprises a limiting elastic arm, the two second engaging portions are opposite to each other, and a distance between each of the two second engaging portions and a corresponding one of the two side walls of the receptacle insulated housing. When the electrical plug connector is mated with the electrical receptacle connector, the two first engaging portion respectively abut against the two second engaging portions, so that each of the two limiting elastic arms is moved from a normal position toward the side wall of the receptacle insulated housing adjacent to the second engaging portion. when each of the two first engaging portions is moved to an engaged position, the two limiting elastic arms are resiliently moved to the normal position to limit movements of the two first engaging portions.

In some embodiments of the instant disclosure, each of the two second engaging portions further comprises a plate body, the limiting elastic arm is connected to a top end of the plate body and protrudes from the top end of the plate body, and the limiting elastic arm and the plate body form an L-shaped structure.

In some embodiments of the instant disclosure, the limiting elastic arm and the plate body are at a same plane.

In some embodiments of the instant disclosure, each of the two first engaging portions comprises a standing body and a bent body, the bent body is connected to a bottom portion of the standing body, the standing body and the bent body are at different planes, and an outer surface of the bent body connected to the standing body has a guiding surface to abut against the limiting elastic arm.

In some embodiments of the instant disclosure, each of the two second engaging portions further comprises an elastic piece connected to a bottom end of the plate body, the elastic piece and the plate body are at different planes, and a gap is between the two elastic pieces of each of the two receptacle fixation members. The two elastic pieces are respectively pushed by a pushing force in the gap, and each of the two elastic pieces drives a corresponding one of the plate bodies and a corresponding one of the two limiting elastic arms to move from the normal position toward the side wall of the receptacle insulated housing adjacent to the second engaging portion, so that in each of the two second engaging portions and a corresponding one of the two first engaging portions, a projection of the limiting elastic arm along a direction toward the elastic piece is not above the first engaging portion.

In some embodiments of the instant disclosure, the electrical connector assembly further comprises an unlocking member, and the unlocking member is placed into the gap to push the two elastic pieces to provide the two elastic pieces with the pushing forces.

In some embodiments of the instant disclosure, a surface of the unlocking member has two guiding bevels, and a distance between the two guiding bevels gradually increases along a direction from a top portion of the unlocking member to a bottom portion of the unlocking member.

In some embodiments of the instant disclosure, the electrical connector assembly further comprises an unlocking member, and the unlocking member is placed into the gap and rotated with respect to the two elastic pieces horizontally to push the two elastic pieces to provide the two elastic pieces with the pushing forces.

In some embodiments of the instant disclosure, the receptacle insulated housing further comprises an end wall, two sides of the end wall are respectively connected to the two side walls, and the end wall is adjacent to one of the two receptacle fixation members. Each of the two receptacle fixation members further comprises a positioning portion, one of two ends of the positioning portion is connected to the second main body, and the other end of the positioning portion extends toward the end wall and is fixed on the end wall.

In some embodiments of the instant disclosure, the receptacle insulated housing further comprises a blocking wall between the second main body and the two second engaging portions, the blocking wall comprises two holes, and connection portions between the two second engaging portions and the second main body are in the two holes.

In the electrical connector assembly according to one embodiment of the instant disclosure, the electrical plug connector comprises plug fixation members and the electrical receptacle connector comprises receptacle fixation members. Therefore, upon using the connector assembly, the electrical plug connector can be ensured not to detach from the electrical receptacle connector. Moreover, the user can detach the electrical plug connector from the electrical receptacle connector.

In one embodiment, if the electrical plug connector has to be detached from the electrical receptacle connector, the two elastic pieces are applied with a force in the gap, so that the two elastic pieces drive the plate bodies and the limiting elastic arms to move toward the side walls. After the limiting elastic arms are moved, the movement of the first engaging portions are not limited by the limiting elastic arms. Therefore, the electrical plug connector can be detached from the electrical receptacle connector easily.

In one embodiment, the electrical connector assembly further comprises the unlocking member, and unlocking member is provided to be placed into the gap between the two elastic pieces. The unlocking member can be directly inserted into the gap or rotated in the gap to apply forces to the two elastic arms, so that the two elastic arms drive the plate bodies and the limiting elastic arms to move. Hence, the electrical plug connector can be detached from the electrical receptacle connector.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
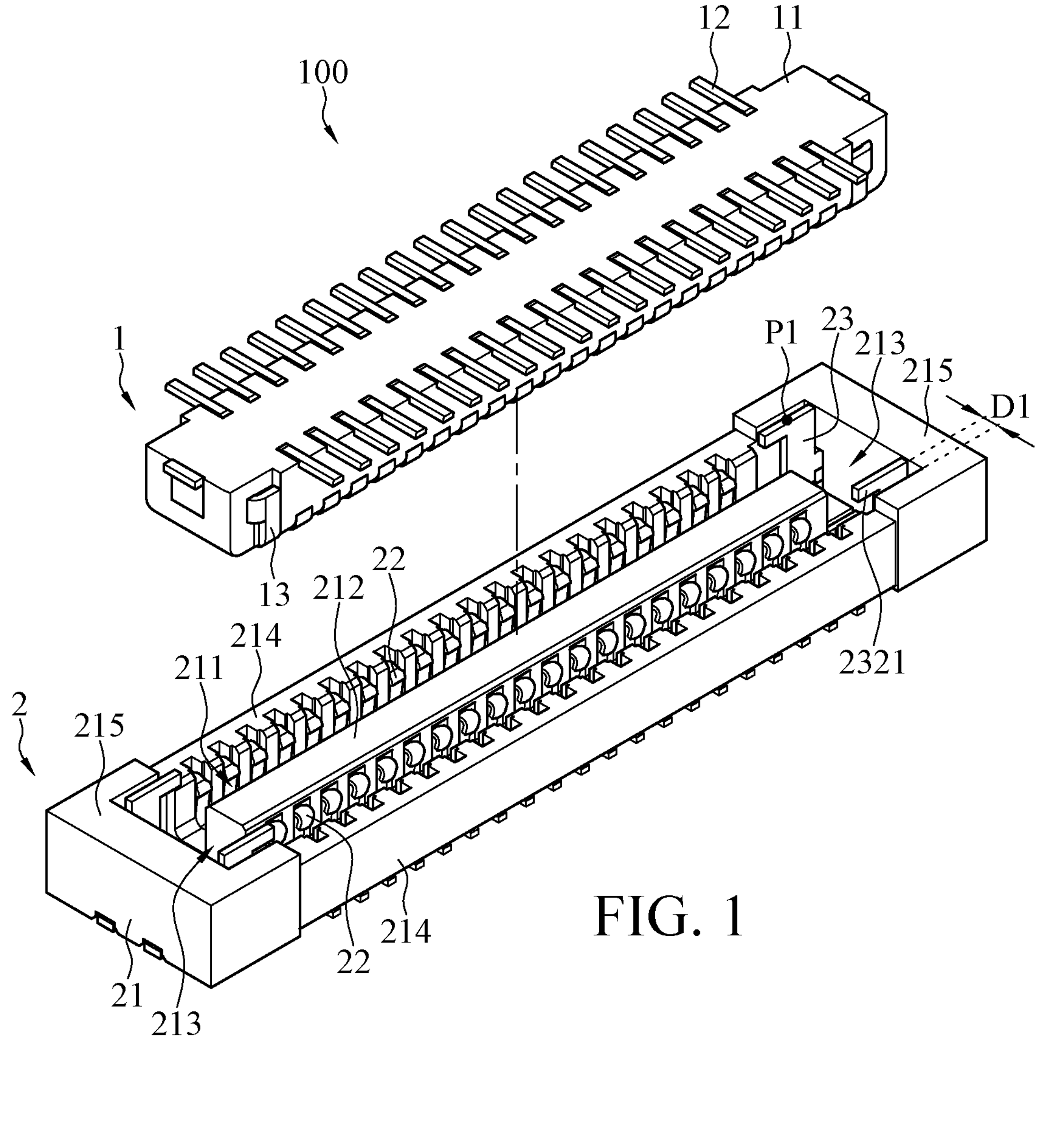
FIG. 1 illustrates an exploded view of an electrical connector assembly according to one embodiment of the instant disclosure.
Figure 2:
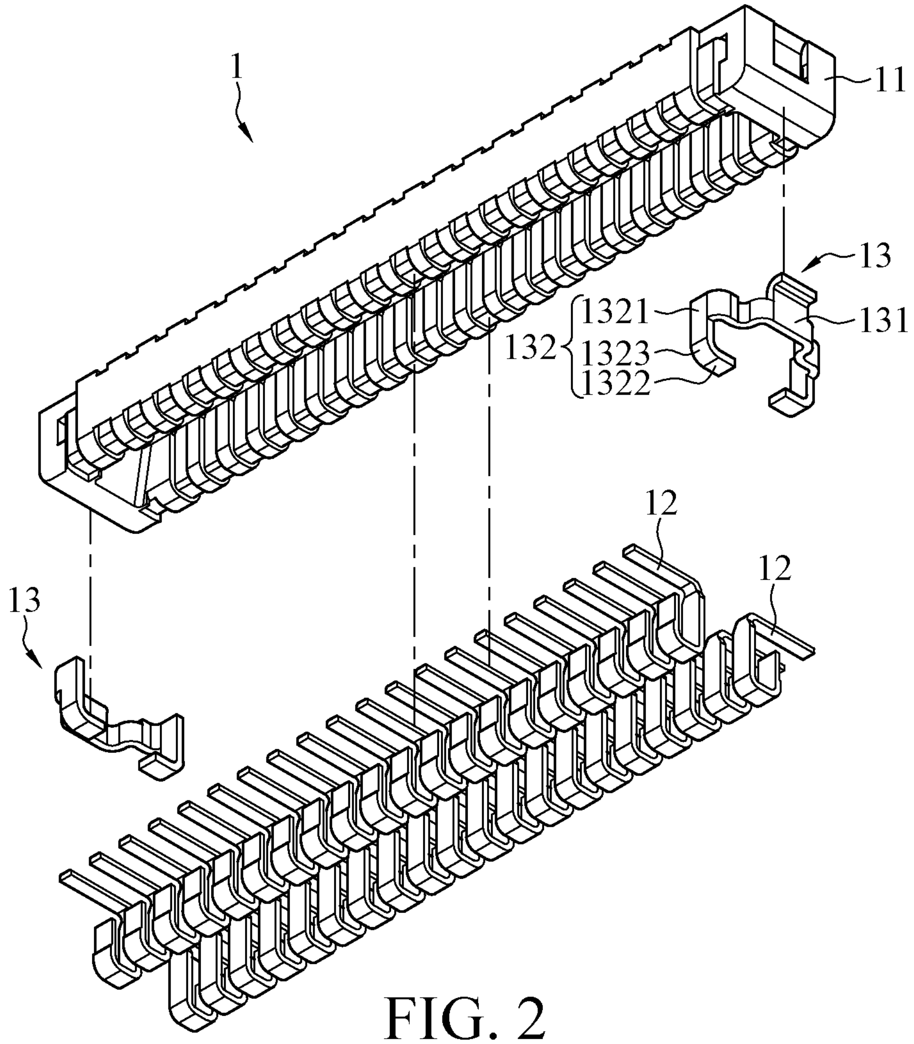
FIG. 2 illustrates an exploded view of an electrical plug connector according to one embodiment of the instant disclosure.
Figure 3:
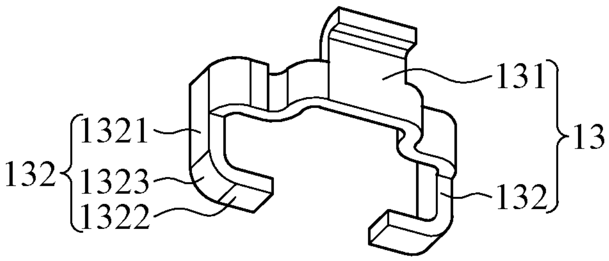
FIG. 3 illustrates a perspective view of a plug fixation member according to one embodiment of the instant disclosure.
Figure 4:
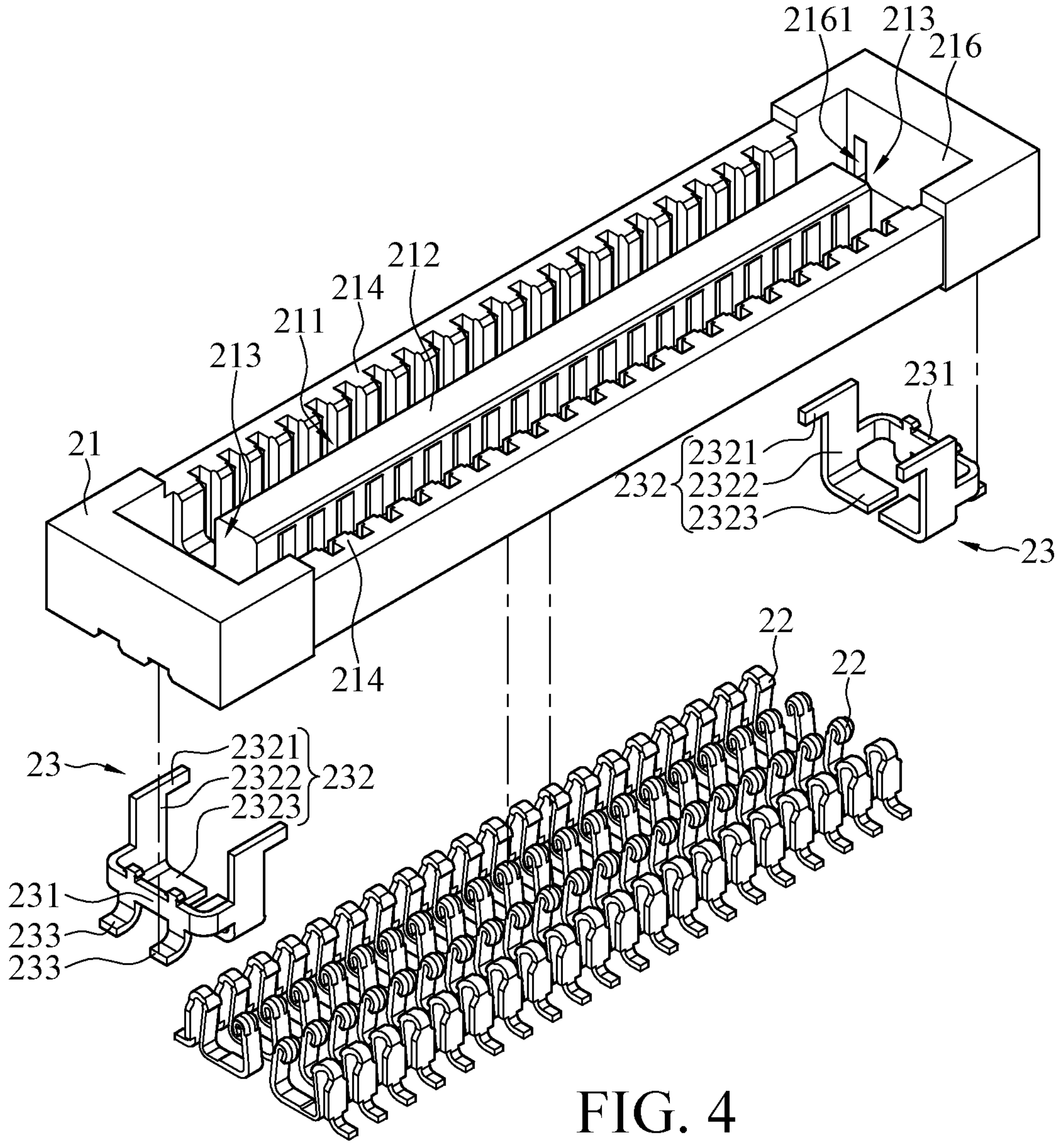
FIG. 4 illustrates an exploded view of an electrical receptacle connector according to one embodiment of the instant disclosure.
Figure 5:
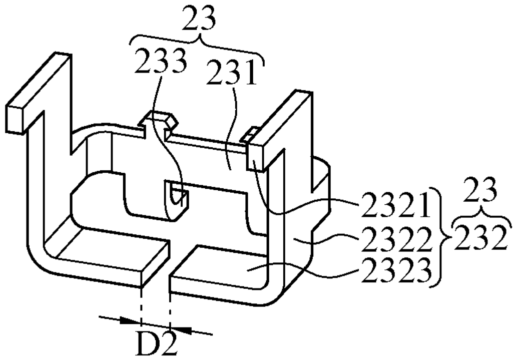
FIG. 5 illustrates a perspective view of a receptacle fixation member according to one embodiment of the instant disclosure.

Please refer to FIG. 1 to FIG. 5. FIG. 1 illustrates an exploded view of an electrical connector assembly 100 according to one embodiment of the instant disclosure. FIG. 2 illustrates an exploded view of an electrical plug connector 1 according to one embodiment of the instant disclosure. FIG. 3 illustrates a perspective view of a plug fixation member 13 according to one embodiment of the instant disclosure. FIG. 4 illustrates an exploded view of an electrical receptacle connector 2 according to one embodiment of the instant disclosure. FIG. 5 illustrates a perspective view of a receptacle fixation member 23 according to one embodiment of the instant disclosure. In this embodiment, the electrical connector assembly 100 comprises an electrical plug connector 1 and an electrical receptacle connector 2, as shown in FIG. 1.

As shown in FIG. 2, in this embodiment, the electrical plug connector 1 comprises a plug insulated housing 11, a plurality of plug terminals 12, and two plug fixation members 13. The plug terminals 12 are on the plug insulated housing 11, and the two plug fixation members 13 are at two ends of the plug insulated housing 11. As shown in FIG. 3, the plug fixation member 13 comprises a first main body 131 and two first engaging portions 132. The two first engaging portions 132 are respectively connected to two sides of the first main body 131. The plug fixation member 13 is flexible, and in some embodiments, the plug fixation member 13 is made of metal. In some embodiments, the plug fixation member 13 is a unitary member.

Figure 8A:
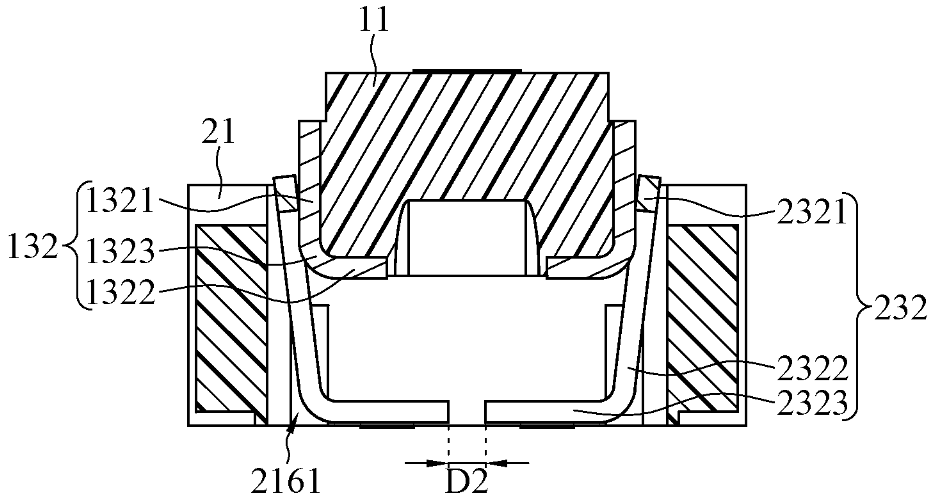
FIG. 8A illustrates a cross-sectional view (1) along the line 8-8 shown in FIG. 6 for showing the plug fixation member is assembled with the receptacle fixation member.
Figure 8B:
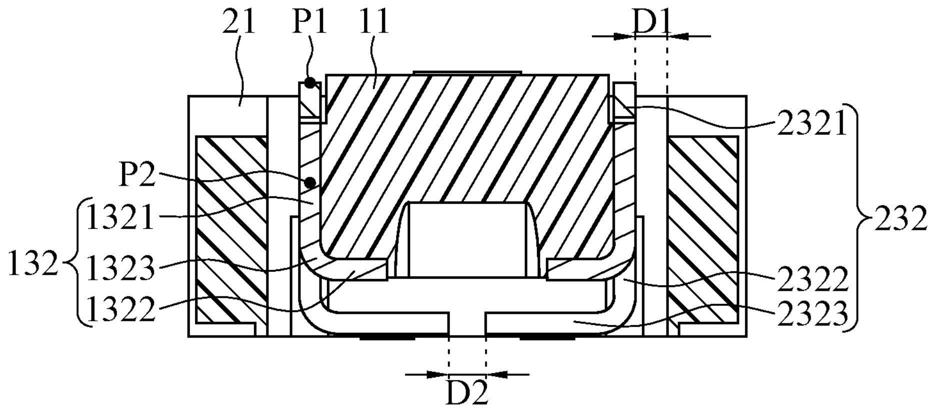
FIG. 8B illustrates a cross-sectional view (2) along the line 8-8 shown in FIG. 6 for showing the plug fixation member is assembled with the receptacle fixation member.

As shown in FIG. 4, the electrical receptacle connector 2 comprises a receptacle insulated housing 21, a plurality of receptacle terminals 22, and two receptacle fixation members 23. The receptacle insulated housing 21 has a space 211 and comprises a guiding post 212. The guiding post 212 extends along an extension direction of the receptacle insulated housing 21 and in the space 211. The receptacle insulated housing 21 further has two connection spaces 213. Each of the two connection spaces 213 communicates a top surface of the receptacle insulated housing 21 with a bottom surface of the receptacle insulated housing 21, and the two connection spaces 213 are at two ends of the guiding post 212. The receptacle terminals 22 are at two side walls 214 of the receptacle insulated housing 21 and two sides of the guiding post 212. The two receptacle fixation members 23 correspond to the two plug fixation members 13 and in the two connection spaces 213. As shown in FIG. 5, the receptacle fixation member 23 comprises a second main body 231 and two second engaging portions 232. The two second engaging portions 232 are respectively connected to two sides of the second main body 231. Each of the second engaging portions 232 comprises a limiting elastic arm 2321. The two second engaging portions 232 are opposite to each other, and a distance D1 is between each of the second engaging portions 232 and a corresponding one of the side walls 214 of the receptacle insulated housing 21 (as shown in FIG. 8A and FIG. 8B). According to the embodiment shown in FIG. 5, the second engaging portion 232 further comprises a plate body 2322. The limiting elastic arm 2321 is connected to a top end of the plate body 2322 and protrudes from the top end of the plate body 2322. The limiting elastic arm 2321 and the plate body 2322 form an L-shaped structure. Moreover, according to the embodiment shown in FIG. 5, the limiting elastic arm 2321 and the plate body 2322 are at a same plane; however, embodiments are not limited thereto. In some embodiments, the limiting elastic arm 2321 and the plate body 2322 are at different planes.

According to the embodiment shown in FIG. 4, the receptacle insulated housing 21 further comprises an end wall 215 (as shown in FIG. 1). Two sides of the end wall 215 are respectively connected to the side walls 214, and the end wall 215 is adjacent to the receptacle fixation member 23. As shown in FIG. 5, the receptacle fixation member 23 further comprises a positioning portion 233. One of two ends of the positioning portion 233 is connected to the second main body 231, and the other end of the positioning portion 233 extends toward the end wall 215 and is fixed on the end wall 215. Moreover, according to the embodiment shown in FIG. 4, the receptacle insulated housing 21 further comprises a blocking wall 216 between the second main body 231 and the two second engaging portions 232. The blocking wall 216 comprises two holes 2161, and connection portions between the two second engaging portions 232 and the second main body 231 are in the two holes 2161. Therefore, in this embodiment, the structures of the blocking wall 216 and the positioning portion 233 allow the receptacle fixation member 23 to have a proper structural strength. The receptacle fixation member 23 is flexible, and in some embodiments, the receptacle fixation member 23 is made of metal. In some embodiments, the receptacle fixation member 23 is a unitary member.

Figure 6:
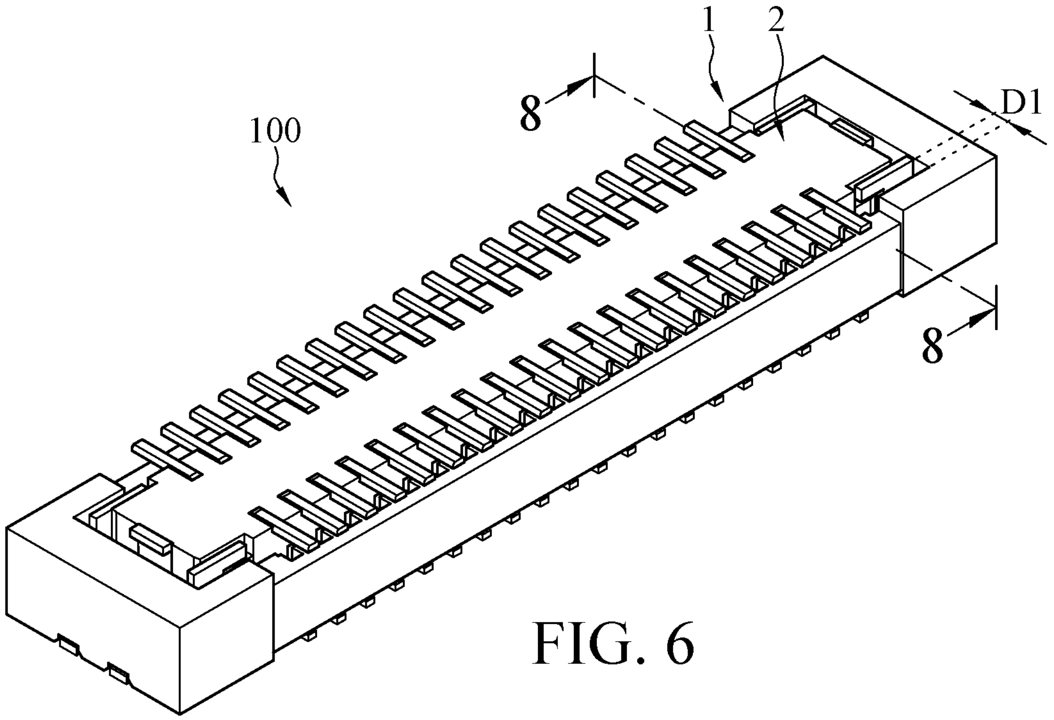
FIG. 6 illustrates a perspective view of an electrical connector assembly according to one embodiment of the instant disclosure.
Figure 7:
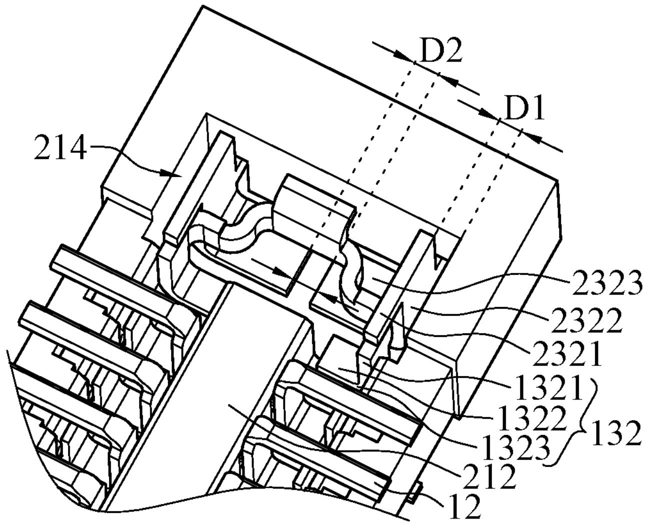
FIG. 7 illustrates a partial perspective view of FIG. 6, where the plug insulated housing is not illustrated.

Please refer to FIG. 6 to FIG. 8B and also refer to FIG. 1 again. FIG. 6 illustrates a perspective view of an electrical connector assembly 100 according to one embodiment of the instant disclosure. FIG. 7 illustrates a partial perspective view of FIG. 6, where the plug insulated housing 11 is not illustrated. FIG. 8A and FIG. 8B illustrate cross-sectional views along the line 8-8 shown in FIG. 6 for showing the plug fixation member 13 is assembled with the receptacle fixation member 23.

According to the embodiment shown in FIG. 1 and FIG. 6, when the electrical plug connector 1 is mated with the electrical receptacle connector 2, the two first engaging portions 132 respectively abut against the two second engaging portions 232. Therefore, each of the limiting elastic arms 2321 is moved from a normal position P1 (the position P1 of the limiting elastic arm 2321 shown in FIG. 1) toward the side wall 214 of the receptacle insulated housing 21 adjacent to the second engaging portion 232. In other words, in this embodiment, the limiting elastic arm 2321 is moved toward the side wall 214 within the distance D1. When each of the two first engaging portions 132 is moved to an engaged position P2, the two limiting elastic arms 132 are resiliently moved to the normal position P2 due that the two limiting elastic arms 2321 are flexible. Therefore, the two limiting elastic arms 2321 of the two second engaging portions 232 are engaged with the two first engaging portions 132 to limit movements of the two first engaging portions 132, as shown in FIG. 7, FIG. 8A, and FIG. 8B. As shown in FIG. 8A, the distance between the two limiting elastic arms 2321 is slightly greater than the distance between the two first engaging portions 132. Therefore, the two first engaging portions 132 can abut against the two limiting elastic arms 2321 easily, so that the two limiting elastic arms 2321 can be expanded. Hence, the two first engaging portions 132 thus can be moved to the engaged position P2 smoothly, and the movements of the two first engaging portions 132 can be moved by the two limiting elastic arms 2321 at the normal positions P1. Accordingly, the electrical plug connector 1 is mated with the electrical receptacle connector 2.

Please refer to FIG. 2 and FIG. 3 again. In this embodiment, the first engaging portion 132 comprise a standing body 1321 and a bent body 1322. The bent body 1322 is connected to a bottom portion of the standing body 1321, and the standing body 1322 and the bent body 1321 are at different planes. An outer surface of the bent body 1322 connected to the standing body 1321 has a guiding surface 1323 to abut against the limiting elastic arm 2321. The guiding surface 1323 is a surface with a chamfered structure. When the electrical plug connector 1 is mated with the electrical receptacle connector 2, the guiding surface 1323 allows the first engaging portion 132 to abut against the limiting elastic arm 2321 conveniently. Therefore, the two limiting elastic arms 2321 can be expanded by the first engaging portions 132 (in other words, the limiting elastic arms 2321 are respectively moved toward adjacent side walls 214), so that the electrical plug connector 1 can be mated with the electrical receptacle connector 2 smoothly.

Figure 9:
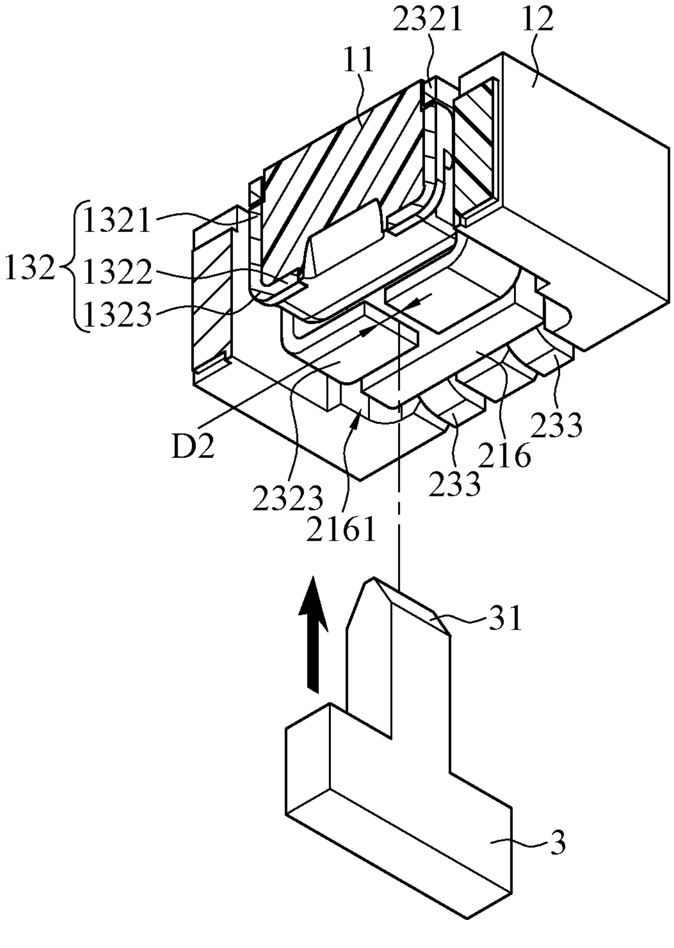
FIG. 9 illustrates a schematic operational view of the electrical connector assembly according to one embodiment of the instant disclosure.
Figure 10:
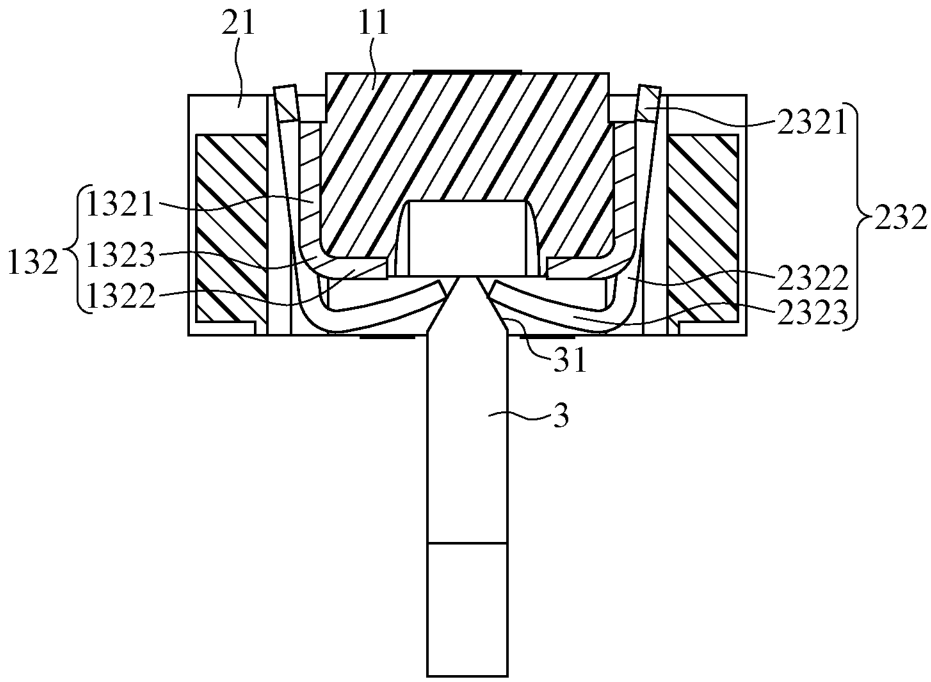
FIG. 10 illustrates a lateral view of FIG. 9.
Figure 11:
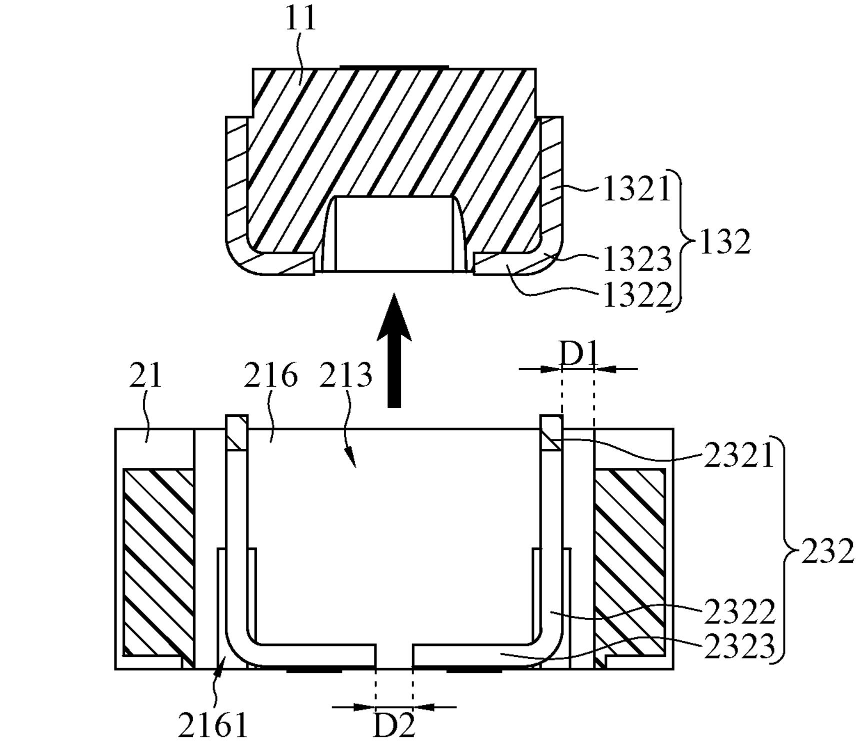
FIG. 11 illustrates a schematic view showing the electrical plug connector is detached from the electrical receptacle connector, from the viewing angle of FIG. 10.

Please refer to FIG. 9 to FIG. 11 and also refer to FIG. 5 again. FIG. 9 illustrates a schematic operational view of the electrical connector assembly 100 according to one embodiment of the instant disclosure. FIG. 10 illustrates a lateral view of FIG. 9. FIG. 11 illustrates a schematic view showing the electrical plug connector 1 is detached from the electrical receptacle connector 2, from the viewing angle of FIG. 10.

According to the embodiment shown in FIG. 5, each of the second engaging portions 232 further comprises an elastic piece 2323 connected to the bottom portion of the plate body 2322, and the elastic piece 2323 and the plate body 2322 are at different planes. A gap D2 is between the two elastic pieces 2323. The two elastic pieces 2323 are respectively pushed by a pushing force in the gap D2. Therefore, each of the two elastic pieces 2323 drives a corresponding one of the plate bodies 2322 and each of the two limiting elastic arms 2321 to move from the normal position P1 toward the side wall 214 of the receptacle insulated housing 21 adjacent to the second engaging portion 232. Therefore, in each of the second engaging portions 232 and a corresponding one of the first engaging portions 132, a projection of the limiting elastic arm 2321 along a direction toward the elastic piece 2323 is not above the first engaging portion 132. In other words, in this embodiment, the limiting elastic arm 2321 is not above the first engaging portion 132. Accordingly, the movement of the first engaging portion 132 in the longitudinal direction is not limited, so that the electrical plug connector 1 can be detached from the electrical receptacle connector 2 smoothly (as shown in FIG. 11).

As shown in FIG. 9, the electrical connector assembly 100 further comprises an unlocking member 3. The unlocking member 3 is placed into the gap D2 to push the two elastic pieces 2323 to provide the two elastic pieces 2323 with the pushing forces. According to the embodiment shown in FIG. 9 and FIG. 10, a surface of the unlocking member 3 has two guiding bevels 31, and a distance between the two guiding bevels 31 gradually increases along a direction from a top portion of the unlocking member 3 to a bottom portion of the unlocking member 3. In this embodiment, through the configuration of the guiding bevels 31, the unlocking member 3 can push the two elastic pieces 2323 easily, so that the elastic pieces 2323 drive the plate bodies 2322 and the limiting elastic arms 2321 to move. Therefore, the electrical plug connector 1 can be detached from the electrical receptacle connector 2 easily (as shown in FIG. 11); however, embodiments are not limited thereto. In some embodiments, the unlocking member 3 is placed into the gap D2 and rotated with respect to the two elastic pieces 2323 horizontally to push the two elastic pieces 2323 to provide the two elastic pieces 2323 with the pushing forces. Accordingly, in this embodiment, the electrical plug connector 1 can also be released from the electrical receptacle connector 2.

In the electrical connector assembly according to one embodiment of the instant disclosure, the electrical plug connector comprises plug fixation members and the electrical receptacle connector comprises receptacle fixation members. Therefore, upon using the electrical connector assembly, the electrical plug connector can be ensured not to detach from the electrical receptacle connector. Moreover, the user can detach the electrical plug connector from the electrical receptacle connector.

In one embodiment, the two elastic pieces are applied with a force in the gap, so that the two elastic pieces drive the plate bodies and the limiting elastic arms to move toward the side walls. After the limiting elastic arms are moved, the movement of the first engaging portions are not limited by the limiting elastic arms. Therefore, the electrical plug connector can be detached from the electrical receptacle connector easily.

In one embodiment, the electrical connector assembly further comprises the unlocking member, and unlocking member is provided to be placed into the gap between the two elastic pieces. The unlocking member can be directly inserted into the gap or rotated in the gap to apply forces to the two elastic arms, so that the two elastic arms drive the plate bodies and the limiting elastic arms to move. Hence, the electrical plug connector can be detached from the electrical receptacle connector.

What is claimed is:

1. An electrical connector assembly, comprising:

an electrical plug connector comprising a plug insulated housing, a plurality of plug terminals, and two plug fixation members, wherein the plug terminals are on the plug insulated housing, and the two plug fixation members are at two ends of the plug insulated housing; each of the two plug fixation members comprises:

a first main body; and two first engaging portions respectively connected to two sides of the first main body; and an electrical receptacle connector comprising a receptacle insulated housing, a plurality of receptacle terminals, and two receptacle fixation members, wherein the receptacle insulated housing has a space and comprises a guiding post, and the guiding post extends along an extension direction of the receptacle insulated housing and in the space; the receptacle insulated housing further has two connection spaces, each of the two connection spaces communicates a top surface of the receptacle insulated housing with a bottom surface of the receptacle insulated housing, and the two connection spaces are at two ends of the guiding post; the receptacle terminals are at two side walls of the receptacle insulated housing and two sides of the guiding post; the two receptacle fixation members correspond to the two plug fixation members and in the two connection spaces; each of the two receptacle fixation members comprises:

a second main body; and two second engaging portions respectively connected to two sides of the second main body, wherein each of the two second engaging portions comprises a limiting elastic arm, the two second engaging portions are opposite to each other, and a distance is between each of the two second engaging portions and a corresponding one of the two side walls of the receptacle insulated housing;

wherein when the electrical plug connector is mated with the electrical receptacle connector, the two first engaging portions respectively abut against the two second engaging portions, so that each of the two limiting elastic arms is moved from a normal position toward the side wall of the receptacle insulated housing adjacent to the second engaging portion; when each of the two first engaging portions is moved to an engaged position, the two limiting elastic arms are resiliently moved to the normal position to limit movements of the two first engaging portions.

2. The electrical connector assembly according to claim 1, wherein each of the two second engaging portions further comprises a plate body, the limiting elastic arm is connected to a top end of the plate body and protrudes from the top end of the plate body, and the limiting elastic arm and the plate body form an L-shaped structure.

3. The electrical connector assembly according to claim 2, wherein the limiting elastic arm and the plate body are at a same plane.

4. The electrical connector assembly according to claim 2, wherein each of the two first engaging portions comprises a standing body and a bent body, the bent body is connected to a bottom portion of the standing body, the standing body and the bent body are at different planes, and an outer surface of the bent body connected to the standing body has a guiding surface to abut against the limiting elastic arm.

5. The electrical connector assembly according to claim 2, wherein each of the two second engaging portions further comprises an elastic piece connected to a bottom end of the plate body, the elastic piece and the plate body are at different planes, and a gap is between the two elastic pieces of each of the two receptacle fixation members; the two elastic pieces are respectively pushed by a pushing force in the gap, and each of the two elastic pieces drives a corresponding one of the plate bodies and a corresponding one of the two limiting elastic arms to move from the normal position toward the side wall of the receptacle insulated housing adjacent to the second engaging portion, so that in each of the two second engaging portions and a corresponding one of the two first engaging portions, a projection of the limiting elastic arm along a direction toward the elastic piece is not above the first engaging portion.

6. The electrical connector assembly according to claim 5, further comprising an unlocking member, wherein the unlocking member is placed into the gap to push the two elastic pieces to provide the two elastic pieces with the pushing forces.

7. The electrical connector assembly according to claim 6, wherein a surface of the unlocking member has two guiding bevels, and a distance between the two guiding bevels gradually increases along a direction from a top portion of the unlocking member to a bottom portion of the unlocking member.

8. The electrical connector assembly according to claim 5, further comprising an unlocking member, wherein the unlocking member is placed into the gap and rotated with respect to the two elastic pieces horizontally to push the two elastic pieces to provide the two elastic pieces with the pushing forces.

9. The electrical connector assembly according to claim 1, wherein the receptacle insulated housing further comprises an end wall, two sides of the end wall are respectively connected to the two side walls, and the end wall is adjacent to one of the two receptacle fixation members; each of the two receptacle fixation members further comprises a positioning portion, one of two ends of the positioning portion is connected to the second main body, and the other end of the positioning portion extends toward the end wall and is fixed on the end wall.

10. The electrical connector assembly according to claim 9, wherein the receptacle insulated housing further comprises a blocking wall between the second main body and the two second engaging portions, the blocking wall comprises two holes, and connection portions between the two second engaging portions and the second main body are in the two holes.

11. An electrical receptacle connector for being mated with an electrical plug connector, wherein the electrical plug connector comprises a plug insulated housing, a plurality of plug terminals, and two plug fixation members, wherein the plug terminals are on the plug insulated housing, and the two plug fixation members are at two ends of the plug insulated housing; each of the two plug fixation members comprises a first main body and two first engaging portions, and the two first engaging portions are respectively connected to two sides of the first main body, wherein the electrical receptacle connector comprises:

a receptacle insulated housing, wherein the receptacle insulated housing has a space and comprises a guiding post, and the guiding post extends along an extension direction of the receptacle insulated housing and in the space; the receptacle insulated housing further has two connection spaces, each of the two connection spaces communicates a top surface of the receptacle insulated housing with a bottom surface of the receptacle insulated housing, and the two connection spaces are at two ends of the guiding post;

a plurality of receptacle terminals, wherein the receptacle terminals are at two side walls of the receptacle insulated housing and two sides of the guiding post; and two receptacle fixation members, wherein the two receptacle fixation members correspond to the two plug fixation members and in the two connection spaces; each of the two receptacle fixation members comprises:

a second main body; and two second engaging portions respectively connected to two sides of the second main body, wherein each of the two second engaging portions comprises a limiting elastic arm, the two second engaging portions are opposite to each other, and a distance is between each of the two second engaging portions and a corresponding one of the two side walls of the receptacle insulated housing;

wherein when the electrical plug connector is mated with the electrical receptacle connector, the two first engaging portions respectively abut against the two second engaging portions, so that each of the two limiting elastic arms is moved from a normal position toward the side wall of the receptacle insulated housing adjacent to the second engaging portion; when each of the two first engaging portions is moved to an engaged position, the two limiting elastic arms are resiliently moved to the normal position to limit movements of the two first engaging portions.

12. The electrical receptacle connector according to claim 11, wherein each of the two second engaging portions further comprises a plate body, the limiting elastic arm is connected to a top end of the plate body and protrudes from the top end of the plate body, and the limiting elastic arm and the plate body form an L-shaped structure.

13. The electrical receptacle connector according to claim 12, wherein the limiting elastic arm and the plate body are at a same plane.

14. The electrical receptacle connector according to claim 12, wherein each of the two first engaging portions comprises a standing body and a bent body, the bent body is connected to a bottom portion of the standing body, the standing body and the bent body are at different planes, and an outer surface of the bent body connected to the standing body has a guiding surface to abut against the limiting elastic arm.

15. The electrical receptacle connector according to claim 12, wherein each of the two second engaging portions further comprises an elastic piece connected to a bottom end of the plate body, the elastic piece and the plate body are at different planes, and a gap is between the two elastic pieces of each of the two receptacle fixation members; the two elastic pieces are respectively pushed by a pushing force in the gap, and each of the two elastic pieces drives a corresponding one of the plate bodies and a corresponding one of the two limiting elastic arms to move from the normal position toward the side wall of the receptacle insulated housing adjacent to the second engaging portion, so that in each of the two second engaging portions and a corresponding one of the two first engaging portions, a projection of the limiting elastic arm along a direction toward the elastic piece is not above the first engaging portion.

16. The electrical receptacle connector according to claim 15, further comprising an unlocking member, wherein the unlocking member is placed into the gap to push the two elastic pieces to provide the two elastic pieces with the pushing forces.

17. The electrical receptacle connector according to claim 16, wherein a surface of the unlocking member has two guiding bevels, and a distance between the two guiding bevels gradually increases along a direction from a top portion of the unlocking member to a bottom portion of the unlocking member.

18. The electrical receptacle connector according to claim 15, further comprising an unlocking member, wherein the unlocking member is placed into the gap and rotated with respect to the two elastic pieces horizontally to push the two elastic pieces to provide the two elastic pieces with the pushing forces.

19. The electrical receptacle connector according to claim 11, wherein the receptacle insulated housing further comprises an end wall, two sides of the end wall are respectively connected to the two side walls, and the end wall is adjacent to one of the two receptacle fixation members; each of the two receptacle fixation members further comprises a positioning portion, one of two ends of the positioning portion is connected to the second main body, and the other end of the positioning portion extends toward the end wall and is fixed on the end wall.

20. The electrical receptacle connector according to claim 19, wherein the receptacle insulated housing further comprises a blocking wall between the second main body and the two second engaging portions, the blocking wall comprises two holes, and connection portions between the two second engaging portions and the second main body are in the two holes.

* * * * *